(12) United States Patent
McGuire (10) Patent No.: US 8,102,876 B2
(45) Date of Patent: Jan. 24, 2012

(54) CLIENT/SERVER ADAPTATION SCHEME FOR COMMUNICATIONS TRAFFIC

(75) Inventor: Alan McGuire, Suffolk (GB)

(73) Assignee: British Telecommunications PLC, London (GB)

( * ) Notice: Subject to any disclaimer, the term of this patent is extended or adjusted under 35 U.S.C. 154(b) by 418 days.

(21) Appl. No.: 12/004,080

(22) Filed: Dec. 20, 2007

(65) Prior Publication Data

US 2009/0161538 A1 Jun. 25, 2009

(51) Int. Cl.
*H04J 3/24* (2006.01)
(52) U.S. Cl. .................................... 370/466; 370/474
(58) Field of Classification Search ........... 370/464–467, 370/474; 709/217–250
See application file for complete search history.

(56) References Cited

U.S. PATENT DOCUMENTS

| | | | |
|---|---|---|---|
| 2005/0053064 A1* | 3/2005 | Wang | 370/389 |
| 2005/0238049 A1* | 10/2005 | Delregno | 370/466 |
| 2005/0271066 A1 | 12/2005 | Valadarsky | |
| 2007/0098006 A1* | 5/2007 | Parry et al. | 370/437 |
| 2007/0116046 A1* | 5/2007 | Liu et al. | 370/466 |
| 2008/0037581 A1* | 2/2008 | Asano | 370/466 |
| 2008/0117895 A1* | 5/2008 | De Heer | 370/389 |

FOREIGN PATENT DOCUMENTS

WO 2009/081139 A1 7/2009

OTHER PUBLICATIONS

Loring Wirbel, "Navy terminals support GFP" EE-Times, Dec. 19, 2005, p. 1.1, XP002522216, Colorado Springs, Colorado.
"Generic Framing Procedure (GFP); G.7041/Y.1303 (Aug. 2005)", ITU-T standard in force (I), International Telecomunication Union, Geneva, CH, No. G7041/Y.1303 (Aug. 22, 2005, XP017404569).

* cited by examiner

*Primary Examiner* — Hassan Kizou
*Assistant Examiner* — Charles C Jiang
(74) *Attorney, Agent, or Firm* — Nixon & Vanderhye PC (57) ABSTRACT

A communications system in which carrier Ethernet conveys a plurality of differing types of client signals encapsulated with a generic framing procedure adaptation layer. The client signals are adapted for encapsulation within the carrier Ethernet frames by mapping the client signal within an generic framing procedure adaptation layer signal and then by mapping the generic framing procedure adaptation layer signal into the carrier Ethernet signal, the client signal being identified within the generic framing procedure signal.

13 Claims, 6 Drawing Sheets

PRIOR ART

CLIENT/SERVER ADAPTATION SCHEME FOR COMMUNICATIONS TRAFFIC

BACKGROUND

1. Technical Field

The present invention relates to a method of adapting client communications traffic for encapsulation within carrier Ethernet by providing an appropriate client/server adaptation mapping protocol for the traffic in a communications network and related aspects thereof.

In particular but not exclusively, the invention relates to a mapping protocol for a plurality of different types of client traffic into Ethernet traffic for transport over an Ethernet carrier network which removes the need for individual Ethertypes to identify the different types of client traffic.

2. Related Art

Ethernet was originally devised as a connectionless packet (Ethernet frame) based communications protocol for local area networks. More recently, however, Ethernet standards are emerging that have extended the reach of the communications protocol to wider area networks such as the Provider Backbone Bridging (PBB) being developed in the International Electrical and Electronic Engineering (IEEE) standards body as 802.1ah. This allows the transparent carriage of a client Ethernet layer network over a server Ethernet layer network. However, since the server Ethernet layer network is connectionless it cannot provide any strong resource assurances to the client Ethernet layer network.

To address this Provider Backbone Bridging-Traffic Engineered (PBB-TE) is also being developed by the IEEE as the 802.1Qay standard. The proposed 802.1Qay standard describes how an Ethernet hierarchy can be implemented to transparently carry conventional (connectionless) Ethernet client LANs over a connection-oriented packet-switched transport network infrastructure as a carrier service. However, where a PBB-TE carrier network is provided problems exist when other non-Ethernet traffic is to be transported over the PBB-TE network. This is not possible using the existing 802.1ah frame structure which is predicated on an Ethernet client.

PBB-TE is a connection-oriented Ethernet protocol which enables connectionless Ethernet to be carried as a client signal in the connection-oriented Ethernet layer using MAC in MAC encapsulation (MAC signifies here Media Access Control). Non-Ethernet client signals do not use MAC in MAC encapsulation. Moreover, it is desirable for non-Ethernet clients to be carried directly over a PBB-TE network using 802.1ad specified Ethernet equipment. This requires the client protocol to be identified using an Ethertype which acts as the protocol identifier. However, this is a far from ideal solution as many non-Ethernet clients do not have an Ethertype currently specified (and may never get such Ethertypes).

Whatever form of Ethernet to be used as a carrier technology, either in its connectionless or connection-oriented form, client traffic must be identified. The connection-oriented packet-switched and connectionless Ethernet standards require client traffic, by which term is meant a communications signal corresponding to another communications protocol which is encapsulated within the payload of the Ethernet frame, to be identified by means of a predetermined field value in the frame header referred to by those of ordinary skill in the art as an "Ethertype". Each different type of communications protocol requires an Ethertype identifier before it can be transported using Ethernet. To obtain an Ethertype, an application is submitted to the Ethernet standards body which is a time-consuming process.

Accordingly, a problem exists in that client traffic cannot be encapsulated within carrier Ethernet unless an Ethertype already exists for that client traffic type. A possible solution would be to request new Ethertypes for all the possible types of client traffic (in addition to Ethernet) that one may wish to carry in advance. Another possible solution is to map the client Ethernet frames into other technologies instead of using an Ethernet-based server layer network. For example, in SDH/SONET and OTN the standardised mechanism is to use Generic Framing Procedure (GFP) and on a PON a similar mechanism known as GPON Encapsulation Mode (GEM). This does not, of course, resolve the problem of how to carry such clients over an Ethernet-based server layer network.

BRIEF SUMMARY

Accordingly, to overcome the problems associated with 'client identification' in a client/server layer network adaptation function when the server layer is Ethernet (including PBB and PBB-TE cases) without requiring an Ethertype for each specific client case, one embodiment of the invention proposes a mapping scheme in which client traffic is first mapped to a GFP adaptation layer prior to being mapped into an Ethernet frame. We thus now only require an Ethertype for GFP and not each of the clients that are carried. The problem of client identification has not disappeared however, but it is now resolved within GFP.

A first aspect of the invention seeks to provide a method of adapting a client signal for encapsulation within a carrier Ethernet frame, the method comprising:

mapping said client signal within a generic framing procedure adaptation layer signal;

mapping said generic framing procedure adaptation layer signal into said carrier Ethernet signal, whereby said client signal is identified within said generic framing procedure signal.

In one embodiment, said carrier Ethernet signal conforms to a connection-oriented packet switched Ethernet communications protocol.

In one embodiment, said carrier Ethernet signal conforms to a connectionless Ethernet communications protocol.

Another aspect of the invention seeks to provide apparatus arranged to adapt a client signal for encapsulation within a carrier Ethernet frame, the apparatus comprising:

a first protocol mapper arranged to map said client signal within a generic framing procedure adaptation layer signal;

a second protocol mapper arranged to map said generic framing procedure adaptation layer signal into said carrier Ethernet signal, whereby said client signal is identified within said generic framing procedure signal.

In one embodiment, said carrier Ethernet signal conforms to a connection-oriented packet switched Ethernet communications protocol.

In one embodiment, said carrier Ethernet signal conforms to a connectionless Ethernet communications protocol.

Another aspect of the invention seeks to provide a method of de-encapsulating the client signal encapsulated according to any of the above method aspects within a carrier Ethernet frame, the method comprising:

de-encapsulating said generic framing procedure adaptation layer signal from said carrier Ethernet signal, processing said de-encapsulated generic framing procedure signal to identify said client signal within said generic framing procedure signal, de-encapsulating said client signal from said generic framing procedure adaptation layer signal.

Another aspect of the invention seeks to provide apparatus arranged to de-encapsulate the client signal encapsulated according to an appropriate method aspect within a carrier Ethernet frame, the apparatus comprising:
- a first protocol mapper arranged to de-encapsulate said generic framing procedure adaptation layer signal from said carrier Ethernet signal;
- a signal processor arranged to process said de-encapsulated generic framing procedure signal to identify said client signal within said generic framing procedure signal; and
- a second protocol mapper arranged to de-encapsulate said client signal from said generic framing procedure adaptation layer signal.

Another aspect of the invention seeks to provide a suite of one or more computer programs which when loaded on to an appropriate hardware platform are arranged to implement appropriate steps in a method aspect.

Aspects of the present invention are as set out above and in the accompanying claims, and the preferred embodiments are as set out above and by the accompanying dependent claims.

Those of ordinary skill in the art will be aware that any appropriate combination of the aspects and preferred embodiments is also encompassed by the invention.

BRIEF DESCRIPTION OF THE DRAWINGS

The preferred embodiment of the invention will now be discussed with reference to the accompanying drawings which are by way of example only and in which.

DETAILED DESCRIPTION OF EXEMPLARY EMBODIMENTS

An exemplary mode of the invention will now be described. Those of ordinary skill in the art will be aware that the description of the exemplary embodiment has been simplified for clarity and may omit to refer explicitly to features which are apparent and already known to those of ordinary skill in the art as essential for its implementation, such features being implicitly included in the description. The description may also omit to mention alternative features which are functionally equivalent to the features recited herein.

Figure 1:
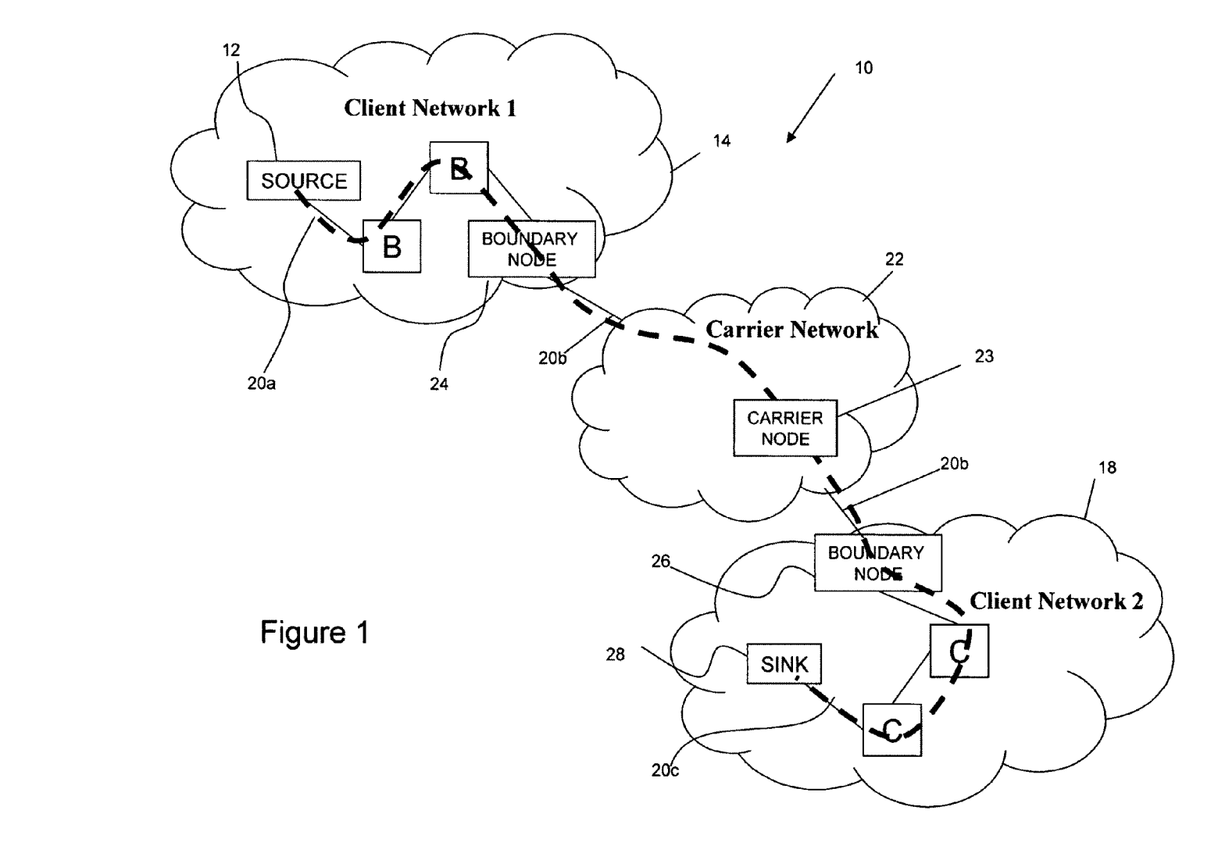
FIG. 1 shows a communications link established between two client networks across a carrier network.

FIG. 1 shows a communications system 10 in which a communications link is established between two client networks across a carrier network. In FIG. 1, a source 12 of traffic in client network 14 generates traffic for a destination address (shown as sink 28) in another client network 18 which requires a path (shown in FIG. 1 by the thick dotted line of communications link 20) to be established over carrier network 22. As is well known in the art, carrier network 22 in fact comprises a number of interconnected network nodes but for clarity and brevity of the description only one, node 23, is shown in FIG. 1. The communications link 20 comprises a partial communications link 20a within the client network 14 according to a communications protocol supported by the source 12 of client traffic. The partial communications link 20a is shown in FIG. 1 as passing via one or more optional intermediate client network nodes "B" before reaching a boundary node 24 between the first client network 14 and the carrier network 22. At this first boundary node 24, traffic conforming to a communications protocol supported by the client network 14 is mapped to a communications protocol supported by the carrier network 22. As those in the art will appreciate, the network nodes each include at least one digital data processor programmed or otherwise configured to automatically perform the necessary mapping functions at network boundaries. Such configuring computer programs are conventionally stored in computer-readable storage media as will also be understood.

The mapped communications traffic is then transported along a partial communications link 20b over the carrier network to a second boundary node 26 of the destination client network 18, where the client communications traffic is recovered. The final portion of the communications link 20c is within the destination client network 18 and is shown as passing via one or more optional intermediate network nodes "C" before reaching its destination 28.

At the boundaries between the client networks 14, 18 and the carrier network 22 the client traffic communications protocol(s) must be mapped into the carrier (also referred to herein as the server) traffic communications protocol.

Many adaptation schemes are already known in the art for mapping client traffic into server traffic where the traffic is to be carried between two geographically separated parts of a client network 14, 18 over a Synchronous Digital Hierarchy carrier network 22. However, where the carrier communications protocol is Ethernet, it is essential for the client communications protocol to be identified within the header of the Ethernet frame. This requires an Ethertype field value to be provided for each type of client communications protocol.

Previously, the number of Ethertypes required was limited as Ethernet was not used as a wide area network carrier technology for carrying other wide area network clients. However, now that connection-oriented packet-switched Ethernet communications protocols are being developed through standards bodies, a problem exists in that it is desirable to be able to carry many different types of communications traffic without needing to apply to a standards body in advance for an Ethertype for each different type of client communications traffic protocol.

Figure 2:
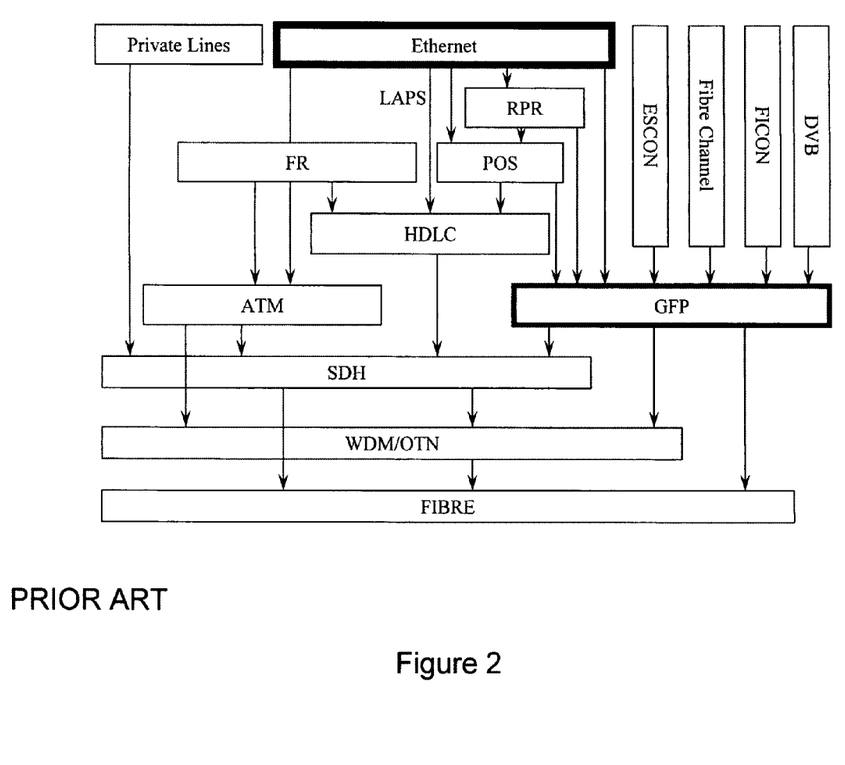
FIG. 2 shows the relationship between a number of different protocols and GFP as is known in the art.

A large number of different types of communications traffic conforming to a number of different communications protocols could form client traffic where Ethernet is providing the carrier network communications protocol. For example, FIG. 2 shows a plurality of different network infrastructure technologies and how they are known to be mapped into each other for transport purposes. For example, traffic carried by private lines can be transported using SDH, which in turn may be carried directly over the physical layer (for example Fibre as shown in FIG. 3) or carried via a wavelength division multiplexed (WDM) or optical transport network (OTN) protocol on top of the Fibre channel.

It is known in the art that Ethernet traffic can be transported using Asynchronous Transport Mode (ATM), High-level Data-Link Control (HDLC) either directly or via Resilient Packet Ring (RPR) mapped into Packet Over SONET (POS) which is based on PPP. Ethernet can also be carried using the Generic Framing Protocol (see ITU-T G.7041 standard for more details of GFP and its use for mapping data protocols or clients for transport over SDH transmission networks) directly or via RPR being mapped into GFP. GFP can carry a range of protocols, for example, Enterprise Systems CONnectivity architecture technology (ESCON), Fibre Channel, Fibre Connectivity (FICON), and Digital Video Broadcasting (DVB) technology. ATM is also used to carry Frame Relay (FR). As shown in FIG. 2, it is known in the art for SDH to carry a range of communications protocols encapsulated in its payload, for example, private lines, ATM, HDLC and GFP. Wave Division Multiplexing/Optical Transport Networks can carry SDH, GFP and ATM. SDH and WDM/OTN and GFP are all capable of being carried over fibre.

Figure 3:
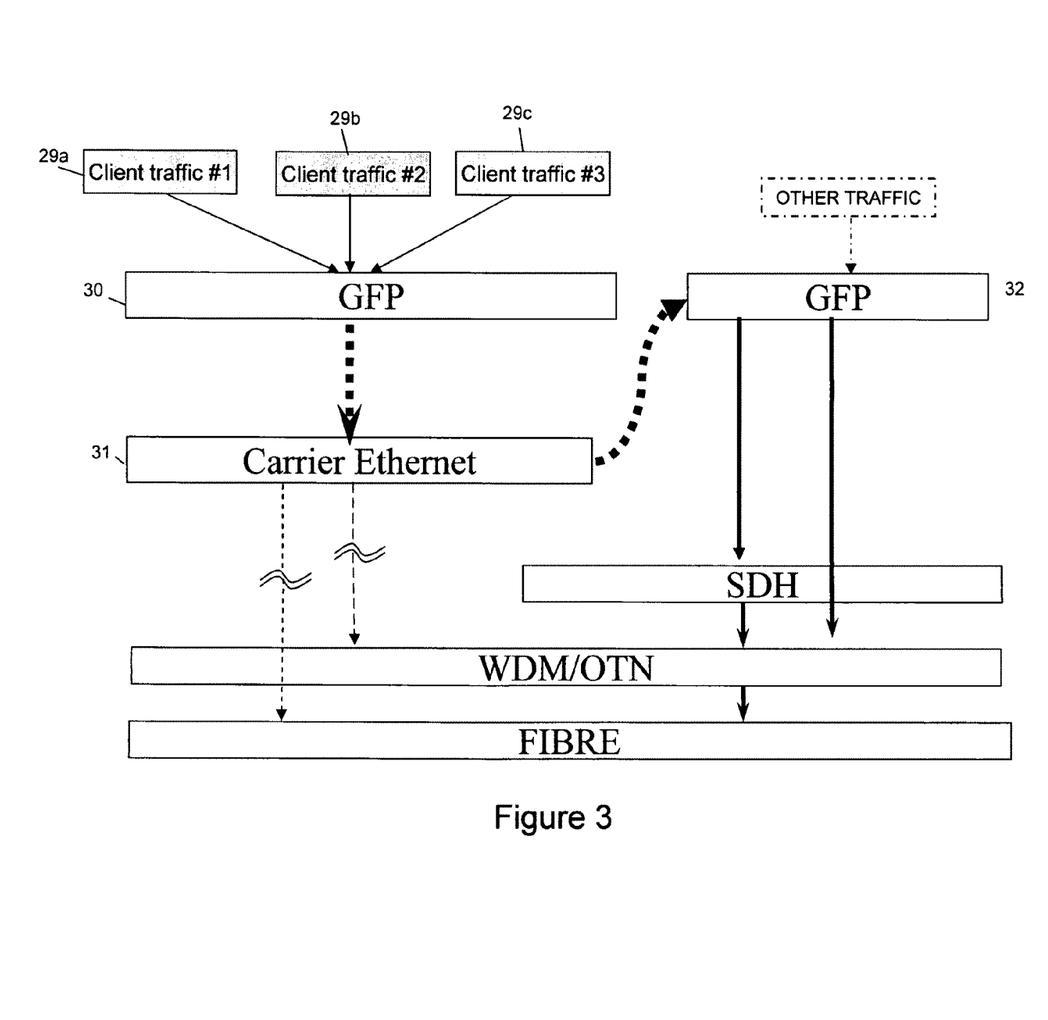
FIG. 3 shows a client/server adaptation scheme according to an embodiment of the invention.

FIG. 3 of the accompanying drawings a plurality of different types of client traffic (client traffic types #1, #2, #3) are to be encapsulated within Ethernet carrier traffic. To avoid the need to obtain Ethertypes for each type of client traffic to enable their identification within the Ethernet carrier frames, a single adaptation layer is provided that itself can provide the client identification function.

Whereas it is known in the art to encapsulate Ethernet (amongst many other types of communications protocol traffic) within Generic Framing Procedure (GFP) communications protocol traffic, the use of GFP as an adaptation layer for Ethernet is understood to be new by the inventors as this is effectively reversing the protocol stack. A GFP frame is encapsulated and carried within the payload of an Ethernet frame (this assumes that the GFP frame size is sufficiently small to fit within the allocated payload for that Ethernet frame).

Figure 4:
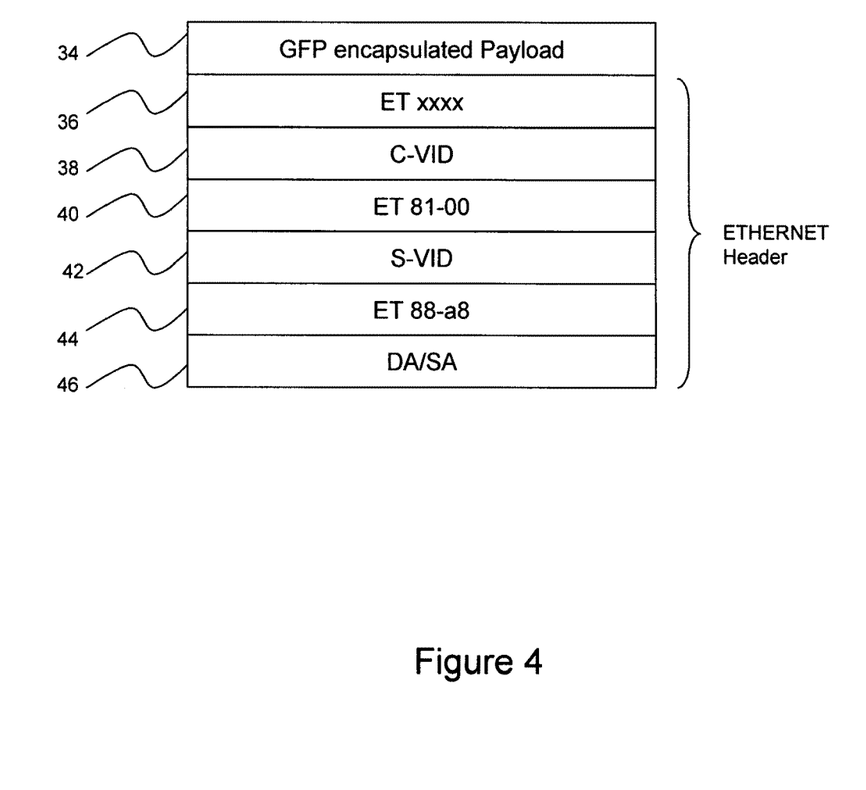
FIG. 4 shows the information captured in an Ethernet frame into which a GFP frame has been mapped according to the invention.

FIG. 4 of the accompanying drawings shows schematically a carrier Ethernet frame according to an embodiment of the invention in which a GFP frame has been encapsulated in the Ethernet payload. In this embodiment, the size of the GFP frame is limited to the size which can be accommodated within the payload 34 of an Ethernet frame. In one embodiment, the Ethernet frame has a minimum payload of 46 bytes and a maximum which is limited by standards to a Maximum Transmission Unit (MTU) of approximately 1500 bytes depending on the specific implementation of the Ethernet communications protocol. Alternatively, other sizes of Ethernet frames, including so called "Jumbo Ethernet frames" of 9000 bytes, may be used to carry GFP traffic in their payload in other embodiments of the invention. Within the header fields of an Ethernet frame the client traffic encapsulated within the Ethernet payload is identified using a payload Ethertype field shown as "ET xxxx" 36 in FIG. 4.

In this embodiment of the invention, this is provided by an Ethertype which identifies the client traffic as GFP encapsulated. In addition, other header information such as the client Virtual LAN identifier (C-VLAN) 38, an Ethertype for the C-VLAN 40, a server VLAN (S-VLAN) 42, and an ethertype of the S-VLAN 44, as well as the usual source and/or destination address information DA/SA 46 are provided. Other information well known to those of ordinary skill in the art as forming part of the structure of an Ethernet frame/header is not explicitly described herein but its inclusion is implicit.

By using GFP as an adaptation layer, instead of mapping a range of different client communications protocols into the carrier Ethernet traffic directly, the client traffic signals are mapped into GFP frames and the GFP signal is mapped into Ethernet traffic. This means that only one Ethertype to identify GFP is required.

This is possible as the GFP communications protocol defines a GFP type field which is a two-octet field of the GFP payload header indicating the content and format of the GFP payload information. The type field distinguishes between services in a multi-service environment. The type field comprises a payload type identifier (PTI), a payload FCS indicator (PFI), an Extension header Identifier (EXI) and User Payload Identifier (UPI). It is the UPI field that carries the information of the actual client traffic carried within the GFP encapsulation. More information can be found in "Optical network Standards: A Comprehensive Guide for Professionals" edited by Khurram Kazi, p. 161, published by Springer-Verlag, copyright 2006 Cisco systems, the contents of which are hereby incorporated by reference. The payload header in GFP enables multiple transport modes to be supported and, optionally, allows for these multiple transport modes to co-exist within the same transport channel. This enables MPLS traffic and Frame Relay and ESCON traffic for example, to all be mapped into GFP which is then in turn mapped into Ethernet.

Figure 5:
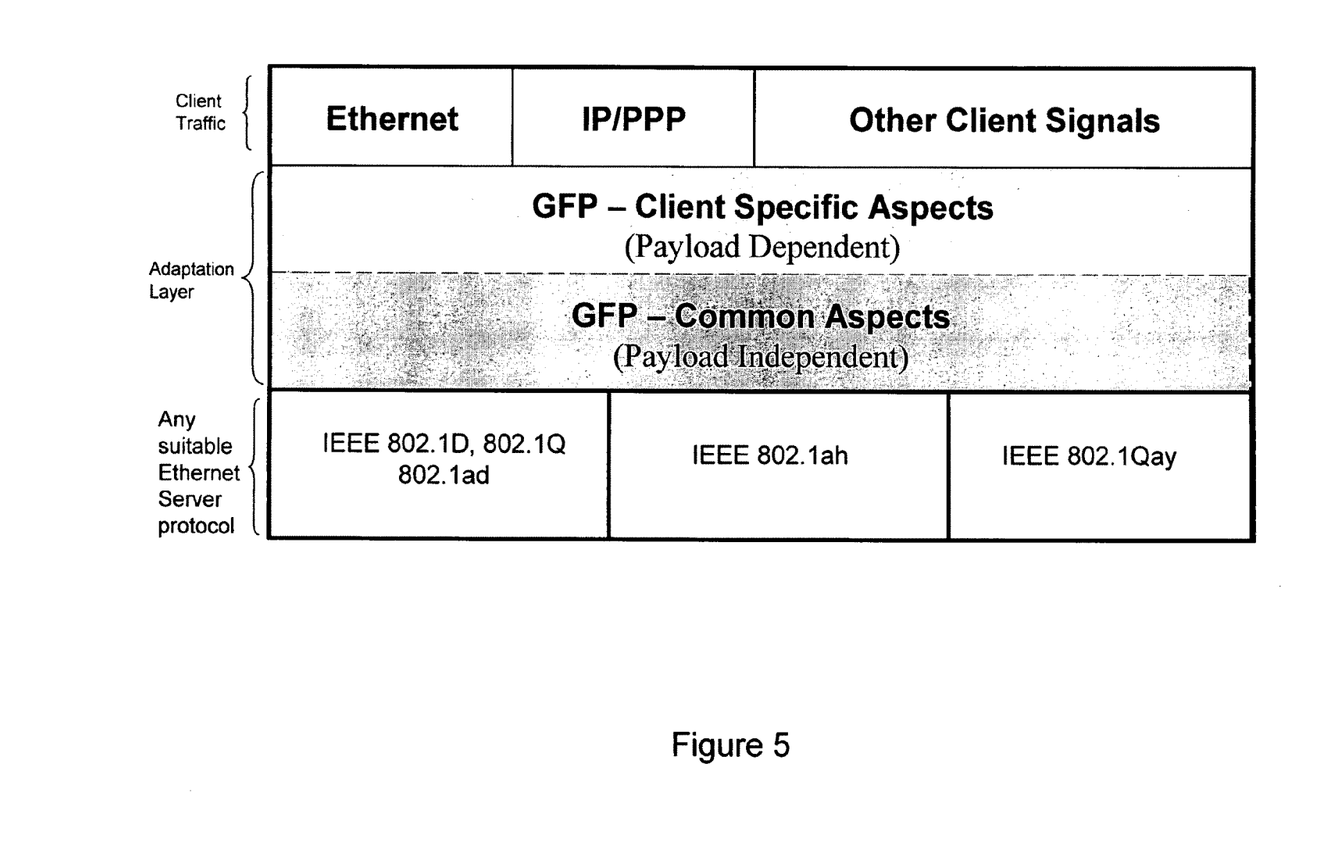
FIG. 5 shows schematically the protocol mapping scheme for GFP frames into Ethernet frames according to an embodiment of the invention.

FIG. 5 of the accompanying drawings shows schematically in more detail how the client signals such as IP/PPP and Ethernet (for example) are mapped into payload dependent (i.e., client specific) aspects of GFP according to an embodiment of the invention, and how the payload dependent GFP is mapped into payload independent common aspects of GFP which are then carried according to the respective embodiment into a suitable Ethernet protocol, for example, the Institute of Electrical and Electronics Engineers (IEEE) 802.1D standard which is the IEEE MAC Bridges standard. 802.1D includes Bridging, Spanning Tree, interworking for 802.11 and others. Other suitable protocols include the virtual LAN standard IEEE 802.1Q, the proposed Provider Bridging standard IEEE 802.1ad, the Provider Backbone Bridging proposed standard IEEE 802.1ah, and also Provider Backbone Bridging-Traffic Engineering (PBB-TE) proposed standard IEEE 802.1Qay.

Returning to FIG. 3, according to this embodiment, one or more client traffic signals 29 (three are shown as client traffic #1, #2, #3, labelled 29a,b,c respectively in the exemplary embodiment of FIG. 3) are carried using a carrier Ethernet communications protocol. Examples of the different types of client traffic 29 include multi-protocol label switched (MPLS) traffic, ESCON, FICON, connectionless Ethernet traffic, connection-oriented Ethernet traffic, or any client traffic for which a user payload identifier for a GFP client frame is known from the G.7041/Y.1303 standards, the contents of which are hereby incorporated by reference.

As shown in FIG. 3, the client traffic 29 is encapsulated first within an adaptation layer 30 provided by the GFP communications protocol, using any appropriate mapping scheme already known to those of ordinary skill in the art for mapping the relevant client signal into GFP.

The GFP traffic is then mapped into the carrier Ethernet layer 31 by encapsulating the GFP frame into the payload of the carrier Ethernet frame. This is performed using a communications protocol mapping according to an embodiment of the invention in which the boundary node 24 at the edge of the client network 14 which processes the received client signals and maps them firstly to the GFP protocol and then takes the GFP frame and processes it to form the payload of the Ethernet frame and adds the Ethertype for the GFP encapsulated payload to the appropriate carrier Ethernet header field. In this way, a single Ethertype is used regardless of the number of client signals that are carried by the Ethernet frame. The protocol mapping can be implemented by using any appropriate mapping techniques already known in the art for mapping other client signals into Ethernet but in this case taking the content and header information from the GFP frame and captures this in the payload and header of the carrier Ethernet frame as FIG. 4 of the accompanying drawings shows which was described in more detail hereinabove.

According to one embodiment of the invention, if the carrier Ethernet 31 is to be carried via connection-oriented circuit-switched mode server layer network, the Ethernet traffic is mapped back into an appropriate adaptation layer 32 for that server, for example, it may use another instance of GFP as is shown in FIG. 3. In this embodiment of the invention, the protocol mapping for client traffic communications protocol "X" is Xover(GFP)ETHover(GFP)SDH. As shown in FIG. 3, the GFP into SDH adaptation layer 32 may optionally also carry other client signals, including "normal" Ethernet, along with the carrier Ethernet. Examples of these other client signals include those shown in FIG. 2.

The adaptation layer 30 according to one embodiment of the invention uses the features of the protocol as defined in the G.7041 standard established by the International Telecommunications Union Telecommunications standardisation sector (ITU-T), the contents of which are hereby incorporated by reference. Those of ordinary skill in the art will be aware that the GFP protocol was intended as a universal mapping mechanism for packets into TDM technologies and as such allows multiple protocols to be supported and is extensible. The preferred embodiment of the invention uses frame-based GFP, but in alternative embodiments of the invention, transparent GFP (GFP-T) is used. GFP-T is an extension to GFP developed to provide efficient low-latency support for high-speed WAN applications including storage area networks. Rather than handling data on a frame-by-frame (packet-by-packet) basis, GFP-T handles block-coded (e.g., 8B/10B) character streams.

Figure 6:
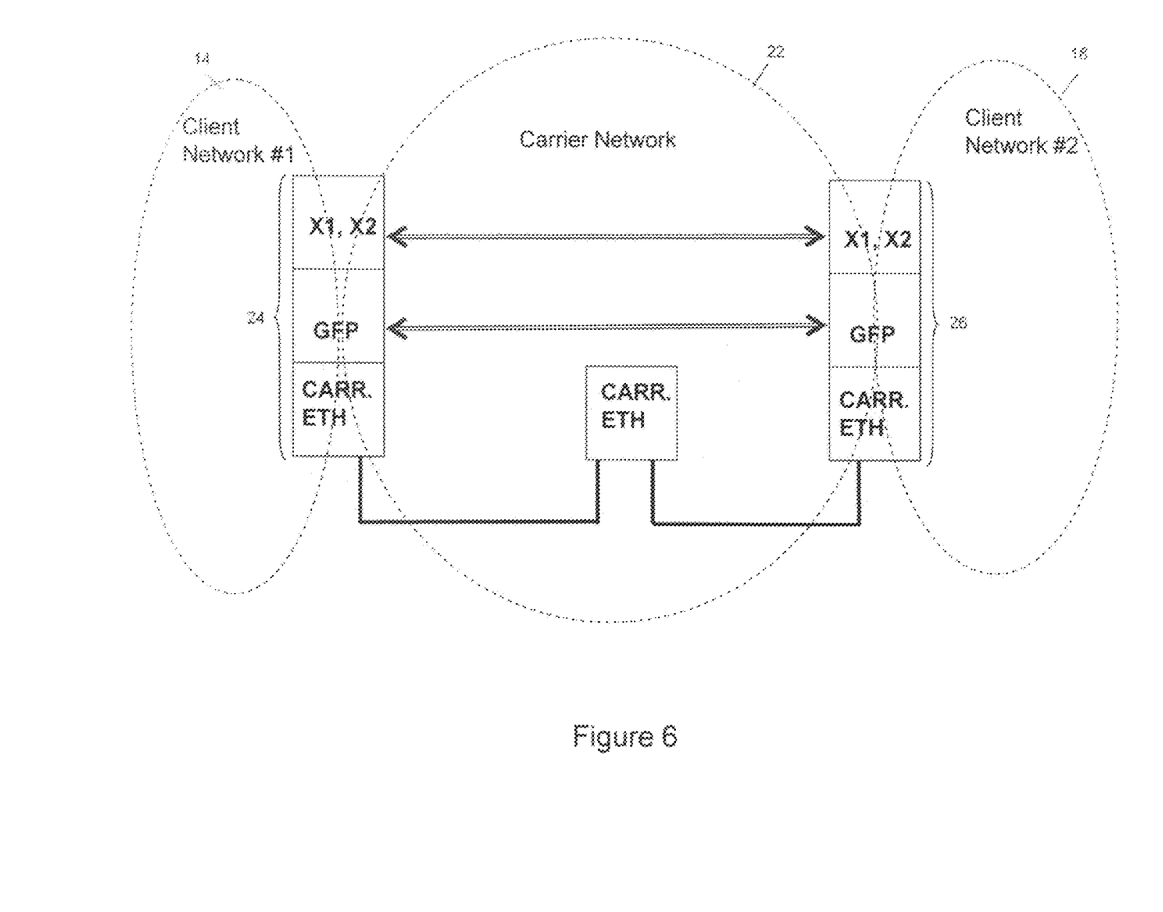
FIG. 6 shows a networking scenario of mapping multiple client protocols via GFP adaptation for carriage across a carrier Ethernet network according to an embodiment of the invention.

FIG. 6 shows a networking scenario of mapping multiple client protocols (X1 and X2 being the examples shown) via GFP adaptation for carriage across a carrier Ethernet network.

In FIG. 6 a given instance of client traffic in a source client network 14 is mapped into a GFP protocol, which is in turn mapped into a carrier Ethernet signal, for example, that provided by a connection-oriented protocol such as PBB-TE.

FIG. 6 shows how two different communications protocols, X1 and X2, are mapped into the adaptation layer GFP communications protocol at the boundary node 24 between the client network 14 and the Ethernet carrier network 22. The left hand side of FIG. 6 shows the protocol stack visible at the boundary node 24, and the right hand side the protocol stack visible at the boundary node 26. Within the Ethernet carrier network, only the carrier Ethernet signal is processed by carrier nodes such as node 23 shown in FIG. 1. At the boundary node 26 between the Ethernet carrier network 22 and the second part of the client network 18, the carrier Ethernet signal is de-encapsulated to extract the adaptation layer signal and finally the client signal is extracted from the adaptation layer.

Thus there is one client per Ethernet frame in this embodiment of the invention which carries all the same type of client. However, in other embodiments of the invention, some of the Ethernet frames carry different types of client frame traffic, and these Ethernet frames are multiplexed together to form the Ethernet connectivity.

As shown in FIG. 6, two different client communication protocol signals, X1 and X2 are encapsulated using the same GFP mechanism which removes the need to obtain a wide variety of Ethertypes when mapping a plurality of different communications protocols into Ethernet. Instead, just one Ethertype is needed to identify the GFP into Ethernet mapping. The Ethernet traffic frames receiving the GFP conform to a connection-oriented communications protocol such as PBB-TE in one embodiment of the invention. However, in alternative embodiments, the GFP communications protocol is mapped into a conventional Ethernet communications protocol or PBB providing connectionless transport.

Not shown in FIG. 6 are the possible further underlying network infrastructure technologies, such as another layer of GFP over SDH or WDM/OTN or directly over Fibre as were shown in FIGS. 2 and 3.

By first mapping client signals into GFP, and then mapping GFP into Ethernet, the number of Ethertypes required to support multiple client traffic types is reduced. One embodiment of the invention also provides a mechanism to support unusual client formats for Ethernet transport. For example, this enables Ethernet frames plus any preamble and SFD (start of frame delimiter) to be mapped into GFP including proprietary variants, and these are then mapped back into Ethernet using a GFP Ethertype.

One embodiment of a mapping scheme according to the invention enables protocols such as PBB-TE to support fully transparent Ethernet services by mapping these into GFP before encapsulating into the PBB-TE layer (e.g., PBB-TE over PBB-TE) as well as the PBB 802.1ah variant. The invention also provides a mapping scheme which allows GFP to support Ethernet and PBB-TE over SDH/SONET and OTN.

The mapping scheme of the invention requires the client's GFP encapsulated Maximum Transmission Unit (MTU) to fit within an Ethernet frame and requires GFP User Payload Identifiers (UPIs) for Ethernet, PPP (including IP and MPLS), Fiber Channel, FICON, ESCON, and any other protocol which would need to be carried over Ethernet, such as ATM, Frame Relay, X.25, SMDS, etc. As the GFP Client-Multiplexing capability is an 8 bit field in the payload header a maximum of 256 different client signals can be supported (the practical limit is less than this as some values are reserved and cannot be used for client identification purposes).

Each client signal frame is mapped in a one-to-one mapping process to a GFP frame. Each GFP frame is mapped in a one-to-one mapping process to an Ethernet frame. To carry multiple client signals, in an Ethernet channel, for example, if two client signals X1 and X2 are to be carried, each frame of X1 client traffic is mapped to a GFP frame, and each frame of X2 client traffic is mapped to another GFP frame. The resulting sequence of GFP frames forming the GFP channel thus can comprise frames with differing client signal payloads. The sequence of GFP frames is then mapped to a corresponding sequence of Ethernet frames forming the carrier Ethernet channel. Thus in one embodiment of the invention, the Ethernet carrier signal comprises a single client signal but in other embodiments where GFP frames containing different client signals are mapped to the Ethernet frames forming the Ethernet carrier signals, a plurality of different clients signals can be mapped into the same Ethernet carrier signal.

Those of ordinary skill in the art will be aware of modifications and functional equivalents to those described in the above embodiments of the invention, and the scope of the claims should be interpreted to include such variations to the described embodiments where they are apparent to one of ordinary skill in the art.

What is claimed is:

1. A machine-implemented method of transporting client signal across Ethernet nodes of a carrier Ethernet communications network, the method comprising use of at least one programmed digital data processor to effect automatically:

mapping said client signal into a payload area of a generic framing procedure adaptation layer signal; and mapping said generic framing procedure adaptation layer signal into a payload area of a carrier Ethernet frame having a media access control source address and a media access control destination address for routing of said carrier Ethernet frame across Ethernet nodes in said carrier Ethernet communications network, wherein said client signal is identifiable within said generic framing procedure signal when said generic framing procedure signal is transported within said carrier Ethernet frame over the carrier Ethernet communications network, and wherein said carrier Ethernet frame header includes an Ethertype indicating said generic framing procedure adaptation layer signal payload.

2. A method as claimed in claim 1, wherein said carrier Ethernet signal conforms to a connection-oriented packet switched Ethernet communications protocol.

3. A method as claimed in claim 1, wherein said carrier Ethernet frame conforms to a connectionless Ethernet communications protocol.

4. A machine-implemented method of de-encapsulating a client signal transported across Ethernet nodes in an Ethernet communications network according to the method of claim 1, the method further comprising configuring at least one processor to effect:

determining from the Ethertype of a carrier Ethernet frame header further comprising a media access control source address and a media access control destination address, that a payload area of the carrier Ethernet frame comprises a generic frame procedure signal;

de-encapsulating said generic framing procedure adaptation layer signal from said payload area of said carrier Ethernet frame;

processing said de-encapsulated generic framing procedure signal to identify a client signal within a payload area of said generic framing procedure signal; and de-encapsulating said client signal from said generic framing procedure adaptation layer signal.

5. Apparatus arranged to de-encapsulate a client signal transported according to the method of claim 1, the apparatus comprising at least one digital processor configured to provide:

a determination from the Ethertype of a carrier Ethernet frame having a media access control source address and a media access control destination address, that a payload area of the carrier Ethernet frame comprises a generic frame procedure signal;

a first protocol mapper arranged to de-encapsulate said generic framing procedure adaptation layer signal from said payload area of said carrier Ethernet frame;

a signal processor arranged to process said de-encapsulated generic framing procedure signal to identify said client signal within said generic framing procedure signal; and a second protocol mapper arranged to de-encapsulate said client signal from said generic framing procedure adaptation layer signal.

6. A non-transitory computer-readable digital storage medium containing a suite of at least one computer program which when loaded onto a hardware platform is arranged to implement the method as claimed in claim 1.

7. A machine-implemented method as claimed in claim 1, wherein the mapping of the client signal into said generic framing procedure signal occurs at a boundary node between said carrier Ethernet network and said client network.

8. A method as claimed in claim 1, wherein said Ethernet carrier frame transports said client signal across a plurality of links between said Ethernet nodes.

9. A method as claimed in claim 1, wherein said mapping of said client signal comprises encapsulating said client signal within the payload area of said generic framing procedure signal.

10. A method as claimed in claim 1, wherein said mapping of said generic framing procedure signal comprises encapsulating said generic framing procedure signal within the payload area of a said carrier Ethernet frame.

11. Apparatus arranged for use in a communications network comprising three or more Ethernet nodes, the apparatus comprising at least one programmed processor providing:

a first protocol mapper arranged to map a client signal to a payload area within an generic framing procedure adaptation layer signal; and a second protocol mapper arranged to map said generic framing procedure adaptation layer signal into a payload area of a carrier Ethernet frame having a media access control source address and a media access control destination address for routing of said carrier Ethernet frame across Ethernet nodes in said carrier Ethernet communications network, wherein said generic framing procedure signal is identifiable within a header of said carrier Ethernet frame when said carrier Ethernet frame is routed over the Ethernet network, wherein said client signal is identifiable within a header of a said generic framing procedure signal, and wherein said carrier Ethernet frame header includes an Ethertype indicating said generic framing procedure adaptation layer signal payload.

12. Apparatus as claimed in claim 11, wherein said carrier Ethernet frame conforms to a connection-oriented packet switched Ethernet communications protocol.

13. Apparatus as claimed in claim 11, wherein said carrier Ethernet frame conforms to a connectionless Ethernet communications protocol.

* * * * *